(12) United States Patent
Hill et al.

(10) Patent No.: US 11,694,256 B1
(45) Date of Patent: Jul. 4, 2023

(54) MOBILE ENABLED ACTIVATION OF A BANK ACCOUNT

(71) Applicant: Wells Fargo Bank, N.A., San Francisco, CA (US)

(72) Inventors: Miranda Hill, Seattle, WA (US); Christin Chan, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/505,535

(22) Filed: Oct. 19, 2021

Related U.S. Application Data

(63) Continuation of application No. 15/391,482, filed on Dec. 27, 2016, now abandoned, which is a continuation of application No. 14/509,219, filed on Oct. 8, 2014, now abandoned.

(60) Provisional application No. 61/889,424, filed on Oct. 10, 2013.

(51) Int. Cl.
*G06Q 40/02* (2023.01)
*G06Q 10/107* (2023.01)

(52) U.S. Cl.
CPC ........... *G06Q 40/02* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 7,766,223 B1 | 8/2010 | Mello et al. | |
| 7,844,519 B2 | 11/2010 | Wehunt et al. | |
| 8,141,134 B2 | 3/2012 | Brandt et al. | |
| 8,295,898 B2 | 10/2012 | Ashfield et al. | |
| 8,306,914 B2 | 11/2012 | Johns et al. | |

(Continued)

FOREIGN PATENT DOCUMENTS

| | | | | |
|---|---|---|---|---|
| CA | 2849815 A1 | * | 4/2013 | ............. G01S 19/34 |
| CA | 2853559 A1 | * | 4/2013 | ............. G06Q 20/20 |

OTHER PUBLICATIONS

A. Lakshminarayanan, "TAP—practical security protocols for wireless personal devices," 2004 IEEE 15th International Symposium on Personal, Indoor and Mobile Radio Communications (IEEE Cat. No. 04TH8754), Barcelona, 2004, pp. 2884-2888 vol. 4. (Year: 2004).

(Continued)

*Primary Examiner* — Ayal I. Sharon
(74) *Attorney, Agent, or Firm* — Foley & Lardner LLP

(57) ABSTRACT

A method of activating a bank account comprises establishing, by the bank computer system upon receipt of a selection of the selectable link, a connection with a client device. The connection is established while the client device is located within a bank store location. The method further comprises transmitting first information for display on the client device via a graphical user interface (GUI), receiving customer information relating to activation of the bank account from the bank store computer, transmitting second information for display via the GUI where the second information is displayed subsequent to the first information and is configured to be displayed with an interactive slider component, receiving a customer input via the interactive slider component, and opening an account based on the customer information received from the bank store computer and the customer inputs received from the client device.

20 Claims, 13 Drawing Sheets

(56) References Cited

U.S. PATENT DOCUMENTS

| | | | |
|---|---|---|---|
| 8,341,712 | B2 | 12/2012 | Machani |
| 8,417,614 | B1 | 4/2013 | Mackrell et al. |
| 8,468,090 | B2 | 6/2013 | Lesandro et al. |
| 8,555,355 | B2 | 10/2013 | Rathbun |
| 8,651,373 | B1 | 2/2014 | Block et al. |
| 8,700,527 | B2 | 4/2014 | Dolphin et al. |
| 9,275,360 | B2 | 3/2016 | He et al. |
| 9,640,040 | B2 | 5/2017 | Irudayam et al. |
| 9,760,871 | B1 | 9/2017 | Pourfallah et al. |
| 9,875,470 | B2 | 1/2018 | Killoran |
| 10,032,168 | B2 | 7/2018 | Kulkarni et al. |
| 10,163,153 | B1 * | 12/2018 | Constantine ........... G06Q 40/00 |
| 10,529,015 | B1 | 1/2020 | Hill et al. |
| 10,546,325 | B2 | 1/2020 | Friborg, Jr. |
| 11,354,732 | B1 | 6/2022 | Hill et al. |
| 2002/0007343 | A1 * | 1/2002 | Oyama ............. G06Q 20/3829 705/40 |
| 2002/0123948 | A1 | 9/2002 | Yumoto |
| 2003/0139994 | A1 | 7/2003 | Jones |
| 2005/0108080 | A1 | 5/2005 | Peterson |
| 2005/0108083 | A1 | 5/2005 | Peterson |
| 2006/0116898 | A1 | 6/2006 | Peterson |
| 2006/0143107 | A1 * | 6/2006 | Dumas ................. G06Q 40/06 705/36 R |
| 2007/0061254 | A1 | 3/2007 | Blunck et al. |
| 2007/0081649 | A1 | 4/2007 | Baudino et al. |
| 2007/0088952 | A1 | 4/2007 | Hewitt et al. |
| 2008/0010215 | A1 | 1/2008 | Rackley, III et al. |
| 2008/0070593 | A1 | 3/2008 | Altman et al. |
| 2008/0108324 | A1 | 5/2008 | Moshir et al. |
| 2008/0109370 | A1 | 5/2008 | Moshir et al. |
| 2008/0133930 | A1 | 6/2008 | Moshir et al. |
| 2008/0189185 | A1 * | 8/2008 | Matsuo ................ G06Q 40/02 705/23 |
| 2010/0222037 | A1 * | 9/2010 | Dragt .................... G06Q 30/02 455/414.1 |
| 2010/0241535 | A1 | 9/2010 | Nightengale et al. |
| 2010/0287606 | A1 | 11/2010 | Machani |
| 2011/0004550 | A1 | 1/2011 | Giordano et al. |
| 2011/0166992 | A1 | 7/2011 | Dessert et al. |
| 2011/0208603 | A1 | 8/2011 | Benefield et al. |
| 2011/0208629 | A1 * | 8/2011 | Benefield ............. G06Q 40/00 705/35 |
| 2011/0213658 | A1 * | 9/2011 | Joa ..................... G06Q 20/1085 705/14.58 |
| 2011/0237222 | A1 | 9/2011 | Niejadlik |
| 2011/0276396 | A1 | 11/2011 | Rathod |
| 2012/0054095 | A1 * | 3/2012 | Lesandro ................ G06F 9/452 705/39 |
| 2012/0059757 | A1 * | 3/2012 | Hurwitz ................ G06Q 40/02 705/38 |
| 2012/0078735 | A1 | 3/2012 | Bauer et al. |
| 2012/0109821 | A1 | 5/2012 | Barbour et al. |
| 2012/0136781 | A1 | 5/2012 | Fridman et al. |
| 2012/0191598 | A1 | 7/2012 | Marzo et al. |
| 2012/0216292 | A1 | 8/2012 | Richardson et al. |
| 2012/0232968 | A1 | 9/2012 | Calman et al. |
| 2012/0233066 | A1 | 9/2012 | Vallabhaneni |
| 2012/0253852 | A1 | 10/2012 | Pourfallah et al. |
| 2012/0310692 | A1 | 12/2012 | Maiya et al. |
| 2012/0316992 | A1 | 12/2012 | Oborne |
| 2012/0330830 | A1 | 12/2012 | Mason et al. |
| 2013/0012159 | A1 | 1/2013 | Lodeweyckx |
| 2013/0019013 | A1 | 1/2013 | Rice et al. |
| 2013/0041817 | A1 | 2/2013 | Greenwald et al. |
| 2013/0046634 | A1 | 2/2013 | Grigg et al. |
| 2013/0054422 | A1 | 2/2013 | Desouza et al. |
| 2013/0054468 | A1 | 2/2013 | Fuentes et al. |
| 2013/0065526 | A1 | 3/2013 | Pottier et al. |
| 2013/0144738 | A1 | 6/2013 | Qawami et al. |
| 2013/0151064 | A1 | 6/2013 | Becker et al. |
| 2013/0275192 | A1 | 10/2013 | Aissa |
| 2013/0282459 | A1 | 10/2013 | Smets et al. |
| 2013/0282565 | A1 | 10/2013 | Barta et al. |
| 2014/0012739 | A1 | 1/2014 | Wall et al. |
| 2014/0019352 | A1 | 1/2014 | Shrivastava |
| 2014/0046830 | A1 | 2/2014 | Orozco et al. |
| 2014/0061299 | A1 | 3/2014 | Scipioni |
| 2014/0156525 | A1 | 6/2014 | Grigg |
| 2015/0039452 | A1 | 2/2015 | Barve et al. |
| 2016/0063435 | A1 | 3/2016 | Shah et al. |
| 2016/0078430 | A1 | 3/2016 | Douglas et al. |
| 2016/0125409 | A1 | 5/2016 | Meredith et al. |
| 2016/0132960 | A1 | 5/2016 | Roberts et al. |
| 2017/0344991 | A1 | 11/2017 | Mark et al. |
| 2021/0051148 | A1 | 2/2021 | Parikh et al. |
| 2021/0058383 | A1 * | 2/2021 | Colon .................. H04W 12/63 |
| 2021/0119992 | A1 | 4/2021 | Johnson et al. |
| 2022/0108309 | A1 | 4/2022 | Hosp et al. |
| 2022/0131871 | A1 | 4/2022 | Huang et al. |
| 2022/0188835 | A1 | 6/2022 | Mashologu et al. |

OTHER PUBLICATIONS

J. Suomalainen, "Smartphone assisted security pairings for the Internet of Things," 2014 4th International Conference on Wireless Communications, Vehicular Technology, Information Theory and Aerospace & Electronic Systems (VITAE), Aalborg, 2014, pp. 1-5. (Year: 2014).

Ciurea, Cristian, "The Development of a Mobile Application in a Collaborative Banking System", Informatica Economica, vol. 14, No. 3, 2010, pp. 86-97.

NFC Forum & Bluetooth SIG, Inc., Bluetooth Secure Simple Pairing Using NFC, Application Document, NFC Forum, Jan. 9, 2014, 39 pages.

Parno et al., "Phoolproof Phishing Prevention", CyLab, Dec. 3, 2005, 16 pages.

* cited by examiner

MOBILE ENABLED ACTIVATION OF A BANK ACCOUNT

CROSS-REFERENCE TO RELATED APPLICATIONS

This application is a continuation of U.S. Non-Provisional patent application Ser. No. 15/391,482, entitled "MOBILE ENABLED ACTIVATION OF A BANK ACCOUNT," filed on Dec. 27, 2016, which is a continuation of U.S. Non-Provisional patent application Ser. No. 14/509,219, entitled "MOBILE ENABLED ACTIVATION OF A BANK ACCOUNT," filed on Oct. 8, 2014, which claims the benefit of and priority to U.S. Provisional Application No. 61/889,424, filed Oct. 10, 2013, entitled "MOBILE ENABLED ACTIVATION OF A BANK ACCOUNT," all of which are incorporated by reference herein in their entireties.

BACKGROUND

The present disclosure generally relates to activating a bank account. Specifically, the present disclosure generates to activating a bank account using a server computer and a client device.

SUMMARY

One embodiment of the present disclosure relates a method of activating a bank account. The method comprises establishing, by a bank computer system, a connection with a client device of a customer. The connection is established while the client device is located within a bank store location. The method further comprises providing information of the customer to the client device and receiving customer inputs from the client device while the client device is located within a bank store location. The bank account is activated based on the customer inputs.

Another embodiment of the present disclosure relates to a method of activating a bank account. The method comprises establishing, by a bank computer system, a connection with a client device of a customer. The bank computer system comprises a bank store computer located within the bank store location. The connection is established while the customer is in-person at the bank store location and is in visual contact with a banking representative that is operating the bank store computer. The method further comprises providing an interactive display to the customer via the client device while the customer is in-person at the bank store location. The interactive display shows information of the customer. The method further comprises receiving, by the bank computer system, customer inputs from the client device while the customer interacts with the interactive display and while the customer is in-person at the bank store location. The customer inputs comprise one or more of (i) updates to personal identification and contact information of the customer, (ii) updates to financial information of the customer, and (iii) selections of products and services. The bank account is activated based on the customer inputs.

DETAILED DESCRIPTION

According to example embodiments, systems and methods disclosed herein use a client device such as a mobile phone or handheld computer to facilitate customer-banker interactions during opening of a bank account, such as at a store location of a bank. For example, after the customer enters the store and informs banker of interest in opening an account, the banker may initiate the account opening process and invite the customer to utilize the customer's personal mobile phone or other device to participate. For example, the banker may complete a customer needs assessment and account application while the customer visualizes financial inputs (e.g., via a customer needs assessment) and confirms/validates application information. The banker may then finalize opening of the account and the customer may sign up for additional services such as online banking, mobile banking, electronic documents, and other related services.

Figure 1:
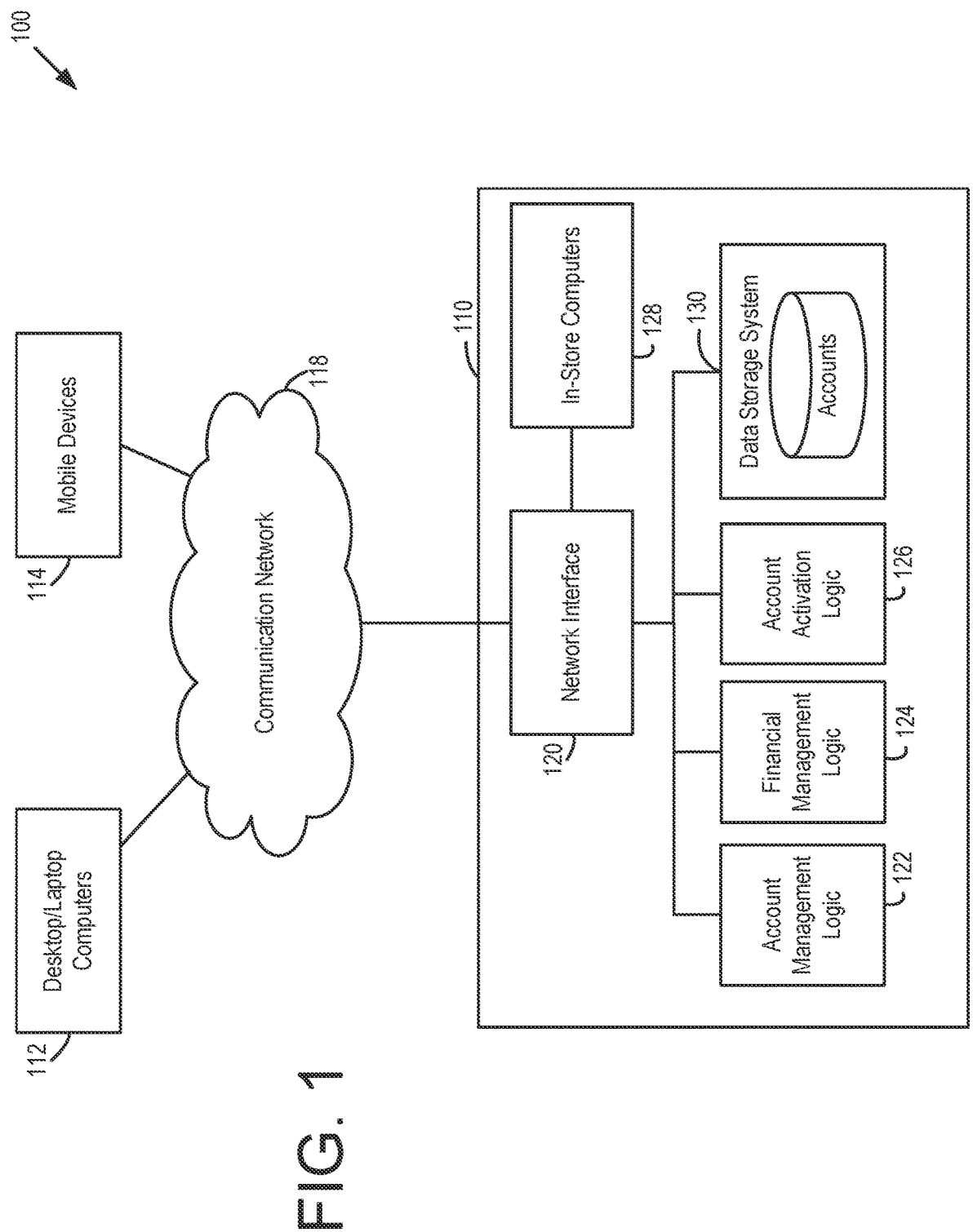
FIG. 1 is a block diagram of a computer architecture for implementing the systems and methods of the present disclosure.

Referring first to FIG. 1, FIG. 1 shows a data processing system 100 that may be used to implement the systems and methods described herein according to an example embodiment. The data processing system 100 includes a bank computer system 110 that may be configured to maintain bank accounts held by account holders. For example, the bank computer system 110 may comprise a system of interconnected servers that, for example, execute stored program instructions to implement the operations described herein. Users (e.g., account holders) may access the system 110 to receive account information using a variety of client devices 112, 114. The client devices 112, 114 may include laptop computers, desktop computers, mobile computing devices (e.g., cell phones, tablets, mobile e-mail devices, and so on). The client devices 112, 114 may access the system 100 through a communication network 118 which may, for example, include the Internet, telephone networks, wireless networks, point-to-point networks, and/or other networks.

Bank computer system 110 may include network interface logic 120, account management logic 122, financial planning logic 124, account activation logic 126, in-store computers 128, and data storage system 130. Network interface logic 120 may be used to establish connections with client devices 112, 114 and to permit users to access accounts in system 110 by way of network 118. For example, in the context of desktop/laptop computers, network interface logic 120 may comprise one or more web servers that provide a graphical user interface (e.g., a series of dynamically-generated web pages) for users that access system 110 through the web. For mobile devices such as cell phones, network interface logic 120 may comprise servers that provide a user interface accessible as a mobile website or via an application executing on the client device. An example of a user interface provided via a client device is described in greater detail below in connection with FIGS. 4A-11.

The account management logic 122 may be configured to perform account processing to process transactions in connection with the accounts of the account holders, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. The account management logic 122 may also be configured to perform processing in connection with other activities associated with the servicing and maintenance of the accounts of the account holders. The account management logic 122 may access and update information stored in the data storage system 130, which stores details regarding financial institution accounts including information for each financial transaction that occurred.

The financial management logic 124 may be configured to analyze data generated during account processing performed by the account management logic 124 to assist the customer with financial management. For example, the financial management logic 124 may include budgeting tools, tools for monitoring cash flow, tools for monitoring investments, tools for developing savings/investment goals, tools for monitoring progress towards savings/investment goals, and so on.

The account activation logic 126 may be configured to facilitate the creation of new bank accounts for new and existing customers of the bank. For example, for new customers, the account activation logic 126 may be configured to collect personal information of the customer to be associated with the new account (e.g., full name and address, driver's license, social security number, and so on). For both new and existing customers, the account activation logic 126 may be configured to collect account configuration information that configures account options based on product selections made by the customer.

The in-store computers 128 may be computers that are located in bank store locations (e.g., branch locations of the bank) and that are used by bank representatives (e.g., bankers) when interacting with customers. For example, the bank store computers may located within a work environment of the bankers, e.g., at the bankers' desks. When customers provide a banker with personal and financial information, the banker may use an in-store bank computer 128 to enter that information into the bank computer system 110.

Figure 2:
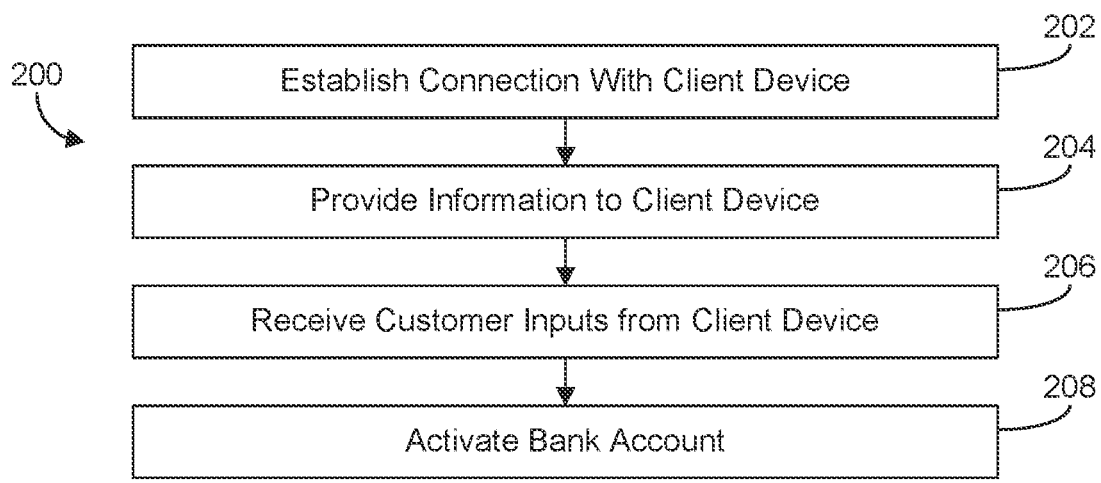
FIG. 2 is a flow chart of a method of activating a bank account, according to an exemplary embodiment.

Referring now to FIG. 2, FIG. 2 is an example method 200 of activating a bank account. Method 200 may be performed by data processing system 100 or another appropriate system. Method begins at step 202 where a connection is established by the bank computer system 100 with the client device 114. For example, the customer may visit a branch location of the bank to open an account. The customer may be sitting in the work area of a banker and talking/interacting with the banker in-person (e.g., including speaking with the banker and making visual contact with the banker). When the customer informs the banker of the customer's interest in opening an account, such as a checking account, a savings account, a line of credit, a loan, etc., the banker may ask the customer to provide contact information. For example, the banker may ask the customer to provide a mobile telephone number. After the banker enters the contact information into the bank computer system 110 via an in-store computer 128, the bank computer system 110 may send an SMS text message to the customer's mobile telephone. The text message may include a link that may be selected by the customer to initiate a simultaneous browsing experience. The link may include a network address such as a uniform resource locator (URL). For example, when the customer selects the link, the customer may be delivered to a secure website of the bank, and the bank computer may establish a connection with the client device 14 while the customer is still engaged in the in-person interaction with the banker in the branch location. In some implementations, the link may include an expiration parameter, such that the client device has a set amount of time in which to be authenticated. In other embodiments, the simultaneous browsing experience may be initiated in another manner. For example, the contact information requested by the banker may be the e-mail address of the customer, and the link may be sent to the customer's e-mail address which is accessible via the customer's mobile phone. As another example, the customer may enter the URL of a mobile website of the bank directly into the browser application of the mobile telephone. In other embodiments, the simultaneous browsing experience may be initiated using a QR code, NFC connection, or in another manner.

At step 204, the bank computer system 110 provides account configuration information to the client device 114. For example, the account configuration information may include personal information that the banker has just collected from the customer (e.g., the name and address of the customer, social security number, and so on), financial management information (e.g., information about financial plans and goals of the customer), information regarding selections of product options (e.g., type of account, account features, and so on), information associated with a needs assessment questionnaire, and/or other types of information. The information may be displayed by the client device 114 to the customer so that the customer can review/validate the information.

At step 206, customer inputs are received by the bank computer system 110 from the client device 114. For example, if the information that is provided to the client device 114 is personal information that the banker has just collected from the customer (e.g., the name and address of the customer, social security number, and so on), then the inputs received from the client device 114 may be corrections to that information (e.g., if the banker erroneously captured the information, for example, by mistyping the customer's last name). As another example, if the information that is provided to the client device 114 is financial management information, then the inputs received from the client device 114 may be adjustments to that information. For example, the client device 114 may provide visualizations of the financial information, and the inputs may be adjustments to the financial information of the customer. As another example, if the information that is provided to the client device 114 is information regarding product options, then the inputs received from the client device 114 may be selections of new/different product options.

At step 208, the bank account is activated. The bank account may be activated based on the information received from the customer in step 206. For example, the bank account may be activated based on customer confirmation that the personal information collected by the banker is correct. As another example, the account may be activated based on adjustments to the financial information of the customer. As another example, the account may be activated using product options selected by the customer.

Figure 3:
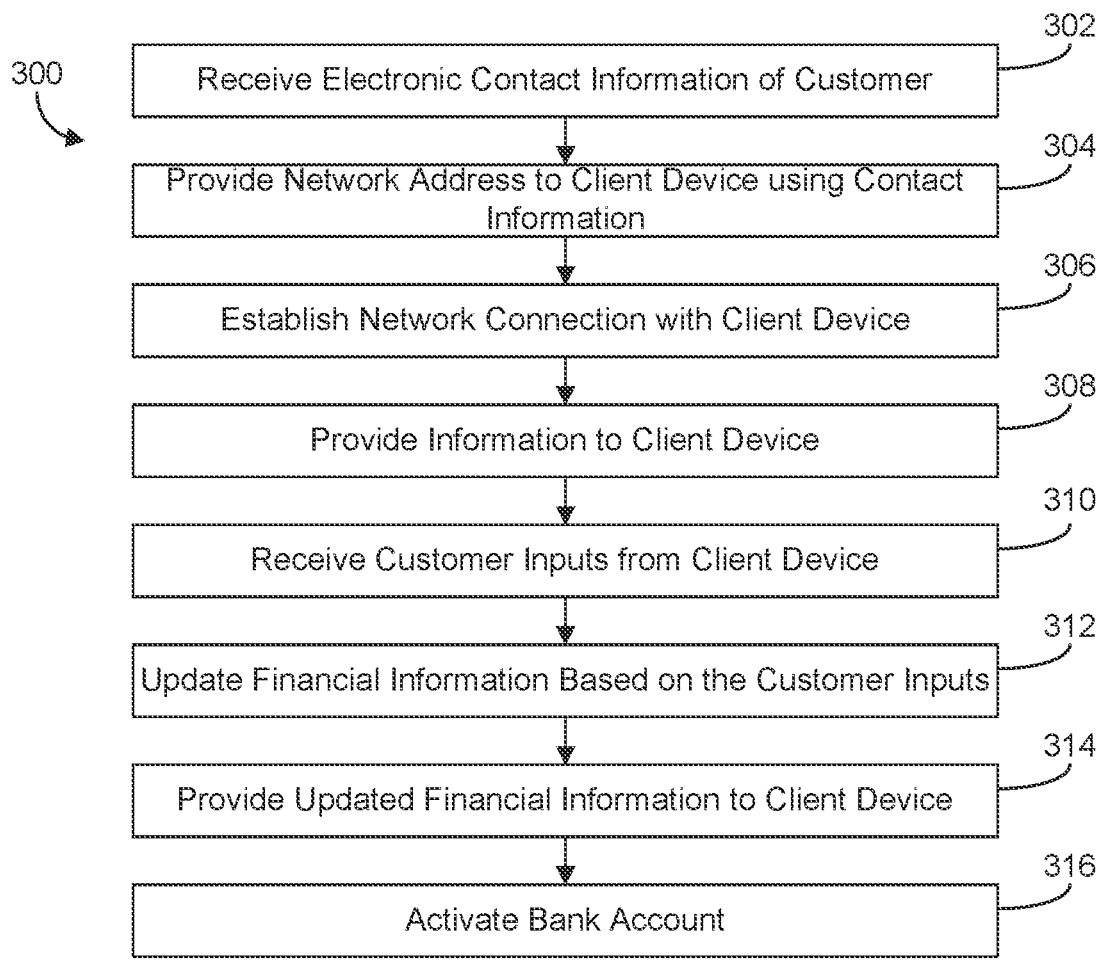
FIG. 3 is a flow chart of a method of activating a bank account, according to an exemplary embodiment.

Referring now to FIGS. 3-11, FIGS. 3-11 provide a more detailed example of an arrangement in which a client device 114 such as a mobile phone or handheld computer is used to facilitate customer-banker interactions during opening of a bank account at a store location of a bank. FIG. 3 is a flowchart showing a process of opening a bank account in greater detail. FIGS. 4A-11 are illustrations of a user interface 400 that may be provided to client device 114 in connection with opening a bank account. Again, in the example shown in FIGS. 3-11, a customer is physically present in a bank. As will be appreciated, in other implementations, the customer may communicate with the bank (or other affiliated location) in another manner, such as via an online interaction or over the telephone using a client device 112 (e.g., a laptop computer).

Figure 4A:
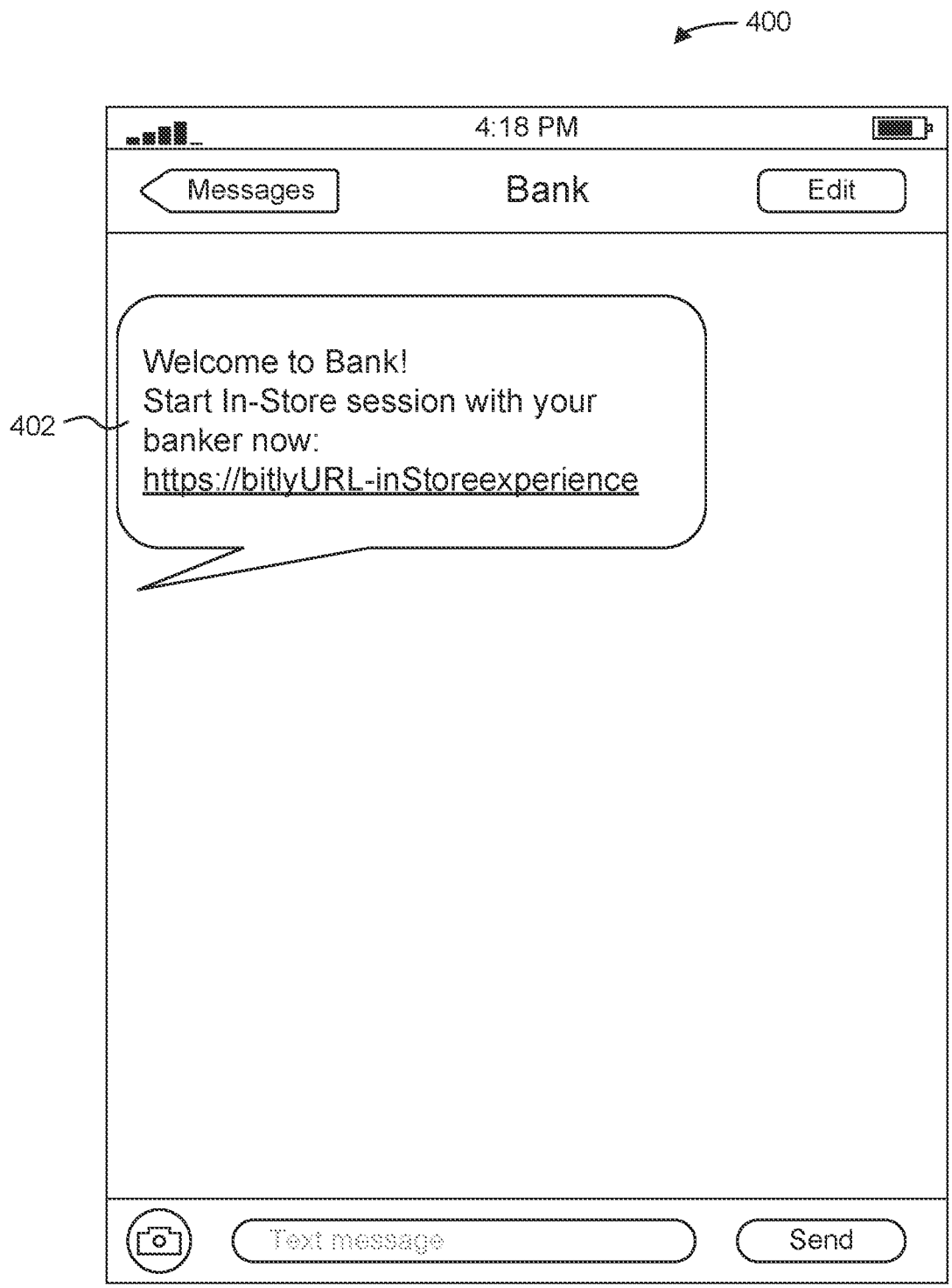
FIG. 4A is an illustration of a user interface of a client device that displays a message to initiate opening a bank account, according to an exemplary embodiment.

Referring first to FIG. 3 and FIG. 4A, initially, a customer may inform a bank representative, such as a banker, of the customer's interest in opening an account. In response, in the example of FIG. 4A, the banker asks the customer to provide a mobile phone number. After the customer provides their mobile telephone number, the banker enters that information into a store computer 130. After the store computer 130 receives the mobile telephone number from the banker (step 302), the store computer 130 may cause the bank computer system 110 to send a text message to the customer (step 304). The text message includes a link that may be selected by the customer to cause the bank computer system 130 to establish a connection with the client device 114 (step 306). For example, the bank computer system 130 may initiate a simultaneous browsing experience for the customer via a secure website of the bank.

Figure 4B:
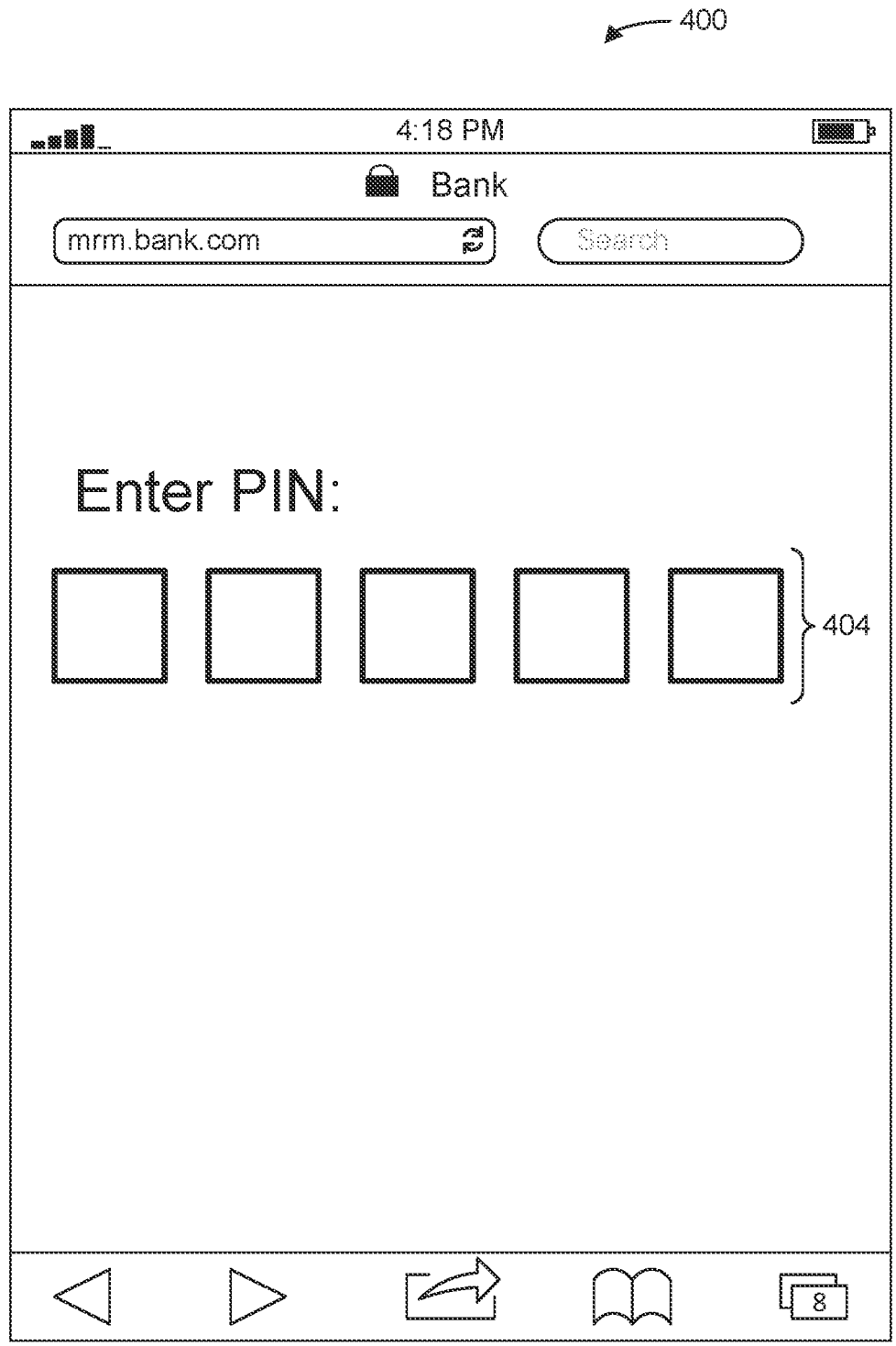
FIG. 4B is an illustration of a user interface of a client device for providing a user with an authentication process, according to an exemplary embodiment.

Referring now to FIG. 4B, after clicking on the link, the customer may be delivered to an authentication page where the customer is then prompted to provide authentication information before being directed to the mobile web application. In the example of FIG. 4B, the customer is asked to provide a PIN 404. As will be appreciated, other authentication methods may be also used. For example, the customer may be prompted to provide a login name/password, a personal identification number, and/or other authentication credentials. The client device 114 may also provide ancillary credentials such as a user identifier (e.g., cookie) and/or or other data associated with the client device 114 that the customer is using to open the bank account. In other embodiments, depending on the type of information exchanged with the mobile device (e.g., if no sensitive information is exchanged), the authentication process may be skipped altogether.

Figure 5:
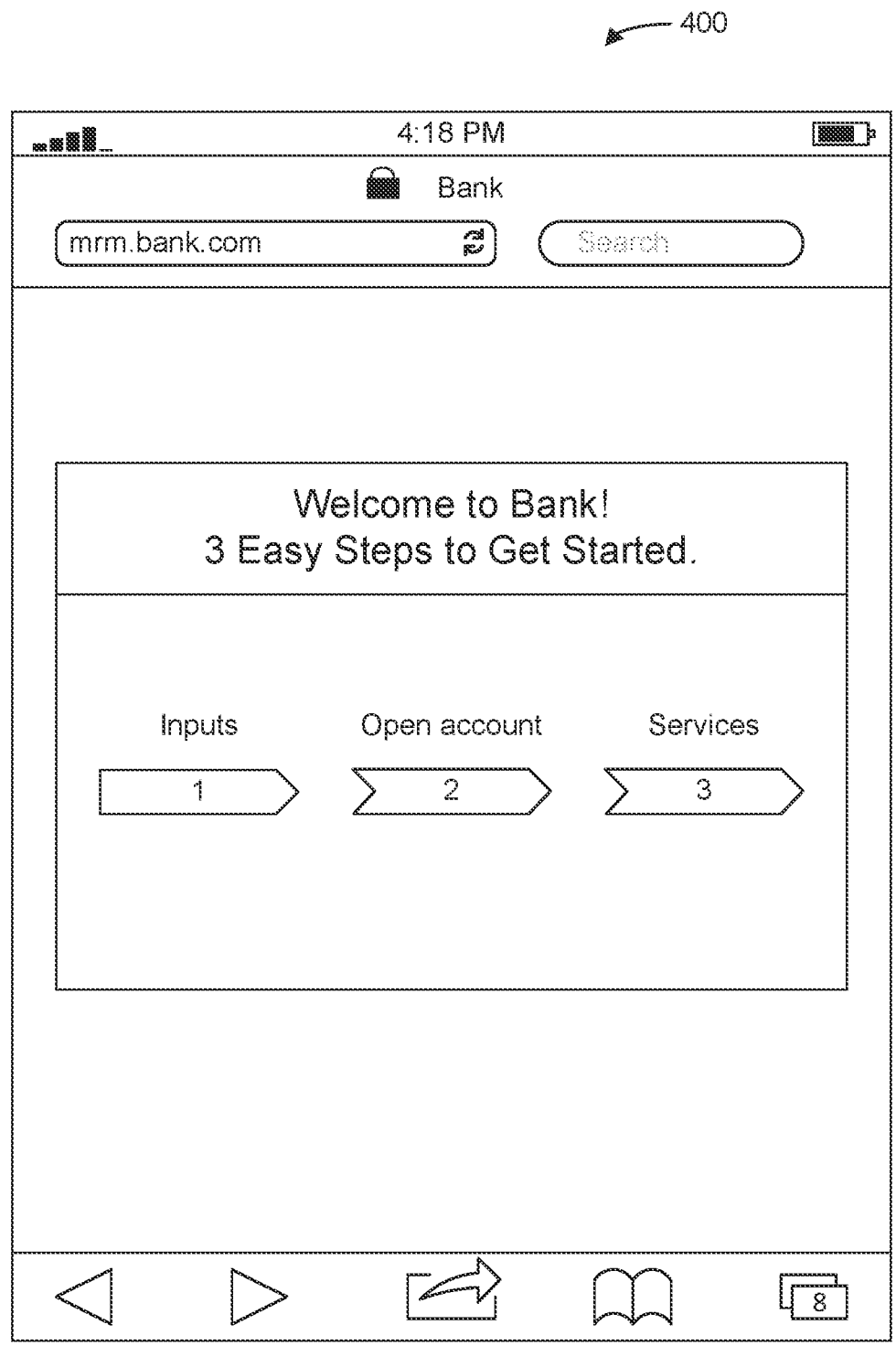
FIG. 5 is an illustration of a user interface of a client device displaying a web browser application, according to an exemplary embodiment.

Referring now to FIG. 5, upon authentication, the customer is delivered to the simultaneous browsing experience. In the example of FIG. 5, the customer is provided with a display that provides an overview of what to expect in the meeting with the banking representative. While this overview is being reviewed by the customer, the banking representative may begin opening the account, which may include filling out a customer needs assessment (CNA) questionnaire on behalf of the customer.

Figure 6A:
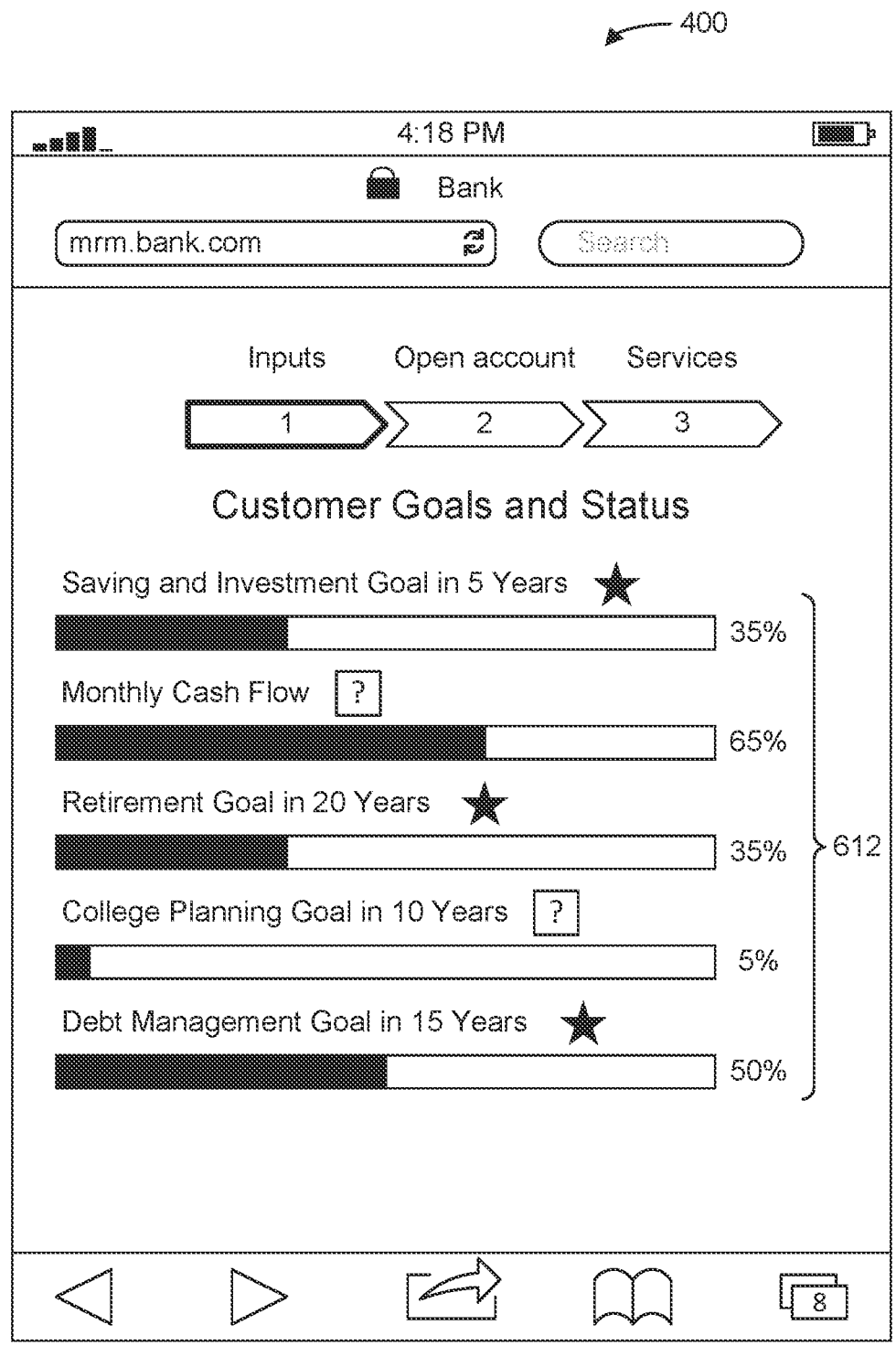
FIG. 6A is an illustration of a user interface of a client device for viewing needs assessment information, according to an exemplary embodiment.
Figure 6B:
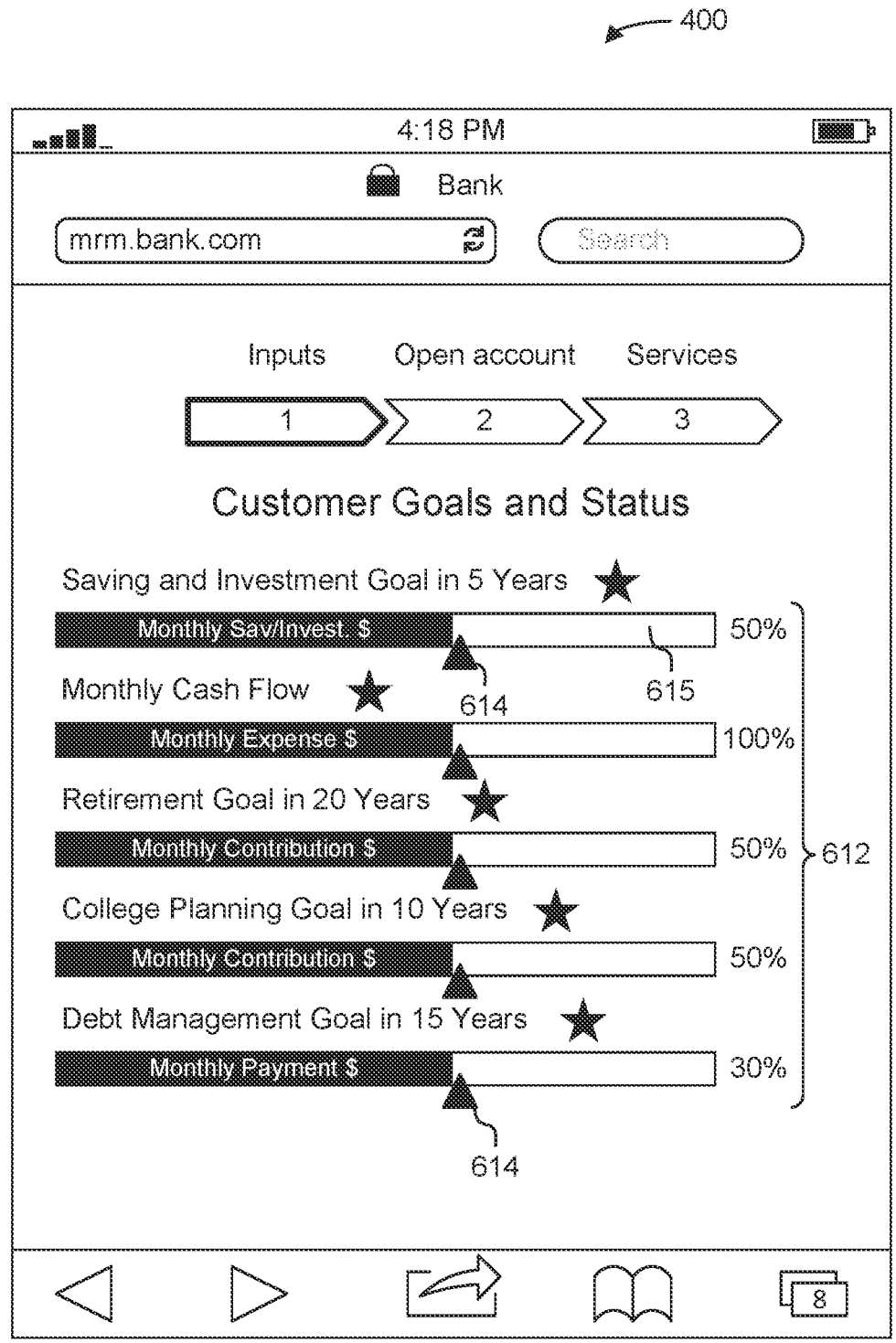
FIG. 6B is an illustration of a user interface of a client device for interacting with the needs assessment information of FIG. 6A, according to an exemplary embodiment.
Figure 6C:
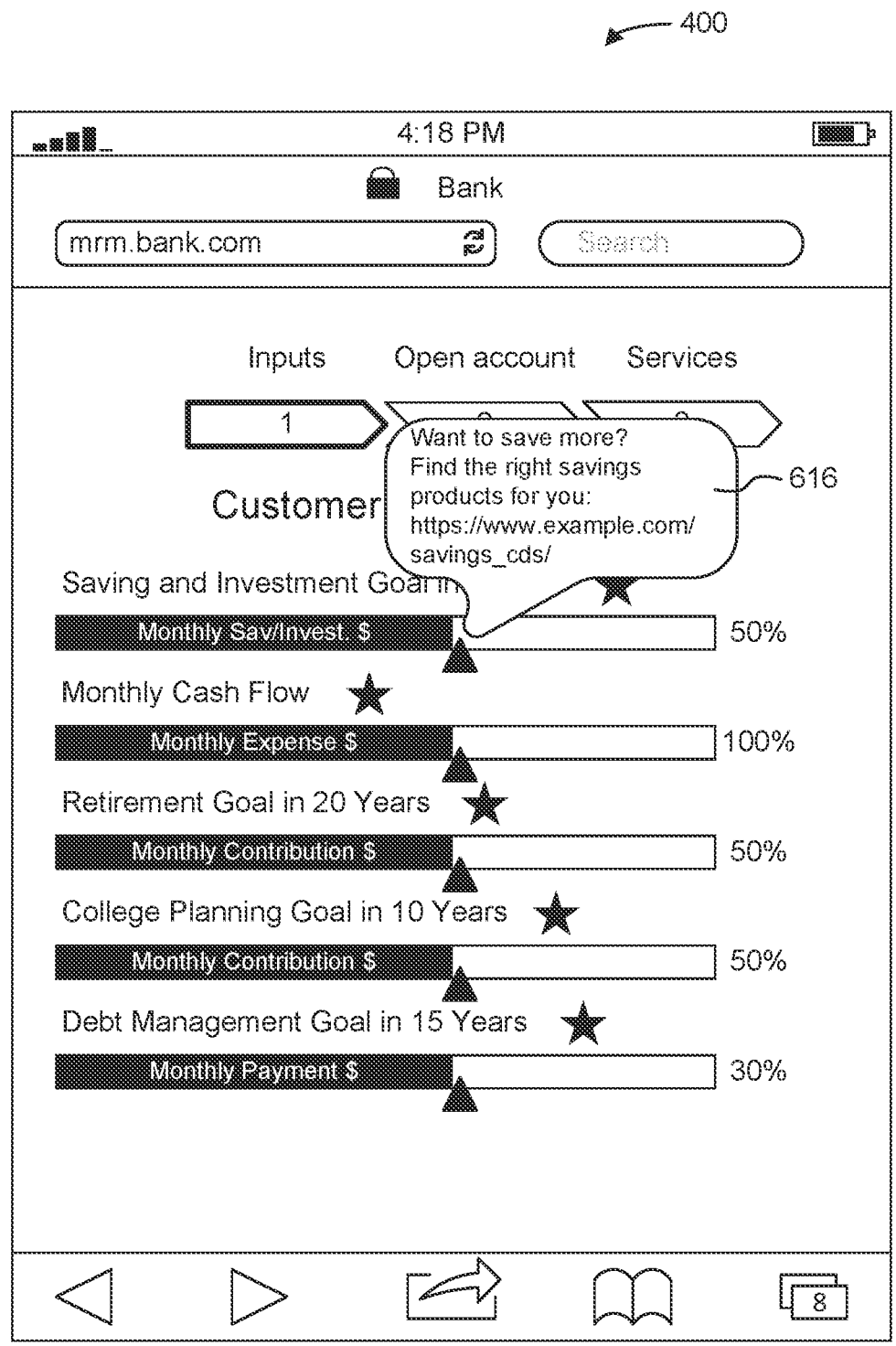
FIG. 6C is an illustration of a user interface of a client device for providing information about additional services to a customer, according to an exemplary embodiment.

Referring now to FIGS. 6A-6C, FIGS. 6A-6C show how the interactive browsing experience may be used to provide information to the customer so that the customer can review/validate the information. With reference first to FIG. 6A, FIG. 6A shows a score card that may be provided to the customer showing various customer goals (step 308). In the example of FIG. 6A, the score card includes bar graphs 712 that provide an indication of how the customer is doing compared to financial goals of the customer. The financial goals may be received from the customer as part of the information obtained by the banker from the customer in connection with the customer needs assessment questionnaire. The display of FIG. 6A may provide a "snapshot" of the information obtained as part of the questionnaire. While information about financial goals is provided in the example of FIG. 6A, as will be appreciated, other information of the customer may also be provided by the bank computer system 110 to the client device 114.

Referring now to FIG. 6B, FIG. 6B shows how the customer may interact with the questionnaire. In the example of FIG. 6B, the customer may provide feedback or other inputs to the bank computer system 110 by interacting with the bar graphs 612 using sliders 614 (step 310). When adjustments to the information shown in FIG. 6B are received from the customer, that information may be updated in the bank computer system 110 (step 312) and updated displays may be interactively provided to the customer (step 314). For example, in FIG. 6B, the customer can use the sliders 614 to visualize how to adjust financial habits to achieve the customer's financial goals. For bar graph 615, the slider 614 represents an amount of money that the customer is allocating towards saving and investing each month relative to the amount of money that would need to be allocated in order to meet the customer's savings and investment goals (e.g., a specified level of assets in five years). By adjusting the slider 614, the customer may receive an indication of the amount of income that would need to be allocated towards saving and investing each month in order to reach the customer's goals. Hence, the customer may receive an indication of how to adjust the customer's habits in order to achieve the customer's goals. Other implementations for the customer to provide feedback and other inputs may also be used.

Referring now to FIG. 6C, FIG. 6C shows an example of the customer being provided with a call to action in connection with the customer's goals. Based on the information received via the sliders 614, the system assesses what additional products or services the customer may need in order to help the customer meet the customer's financial goals. In the example of FIG. 6C, the customer is provided with a link to receive information about additional savings/investment products or services. For example, based on the determination that the customer is currently not allocating enough money each month towards savings and investments, a popup 616 may be provided that includes a link for the customer to select. If an input is received from the customer selecting the link, the customer may be provided with additional information regarding savings and investment products that might help the customer reach their goals. The customer may ultimately select one or more of such savings and investment products, and the account activation may occur based on the selections made by the customer (step 314).

Figure 7:
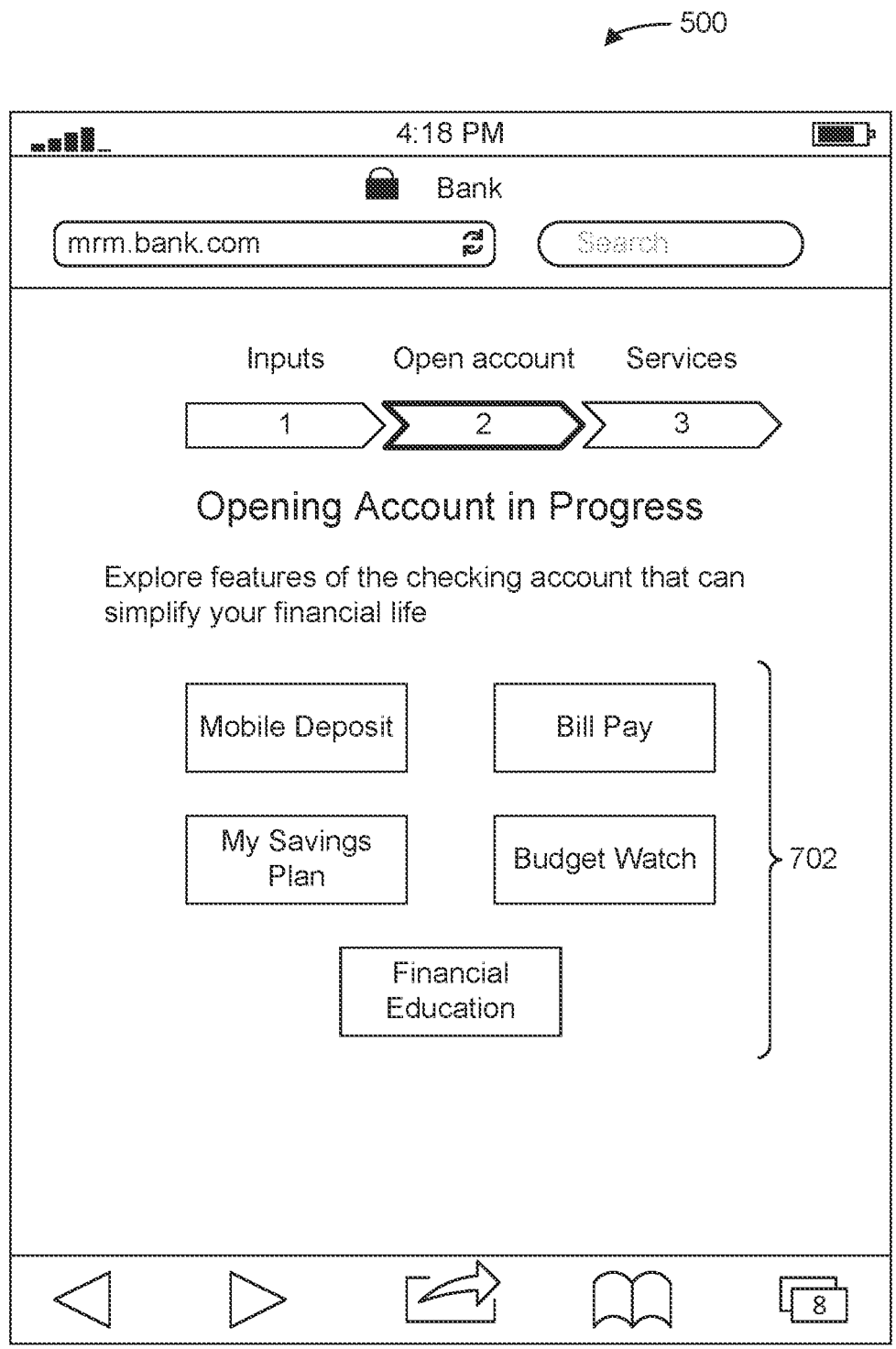
FIG. 7 is an illustration of a user interface of a client device for providing a simultaneous interaction between the banking representative and the customer, according to an exemplary embodiment.

Referring now to FIG. 7, FIG. 7 shows an example of the customer being provided with options to browse additional products and services in connection with an account opening. In the example of FIG. 7, the bank representative has determined based on the customer needs assessment that a checking account meets the needs of the customer. Hence, the banking representative is in the process of opening up a checking account for the customer. At the same time, the customer is provided with options to browse additional account products and services in connection with the checking account (e.g., mobile deposit, bill pay, budget watch, and so on). For example, the customer may select one of the buttons 802 to view the additional information. Again, the customer may ultimately select one or more of such products and services, and the account activation at step 314 may occur based on the selections made by the customer.

Figure 8:
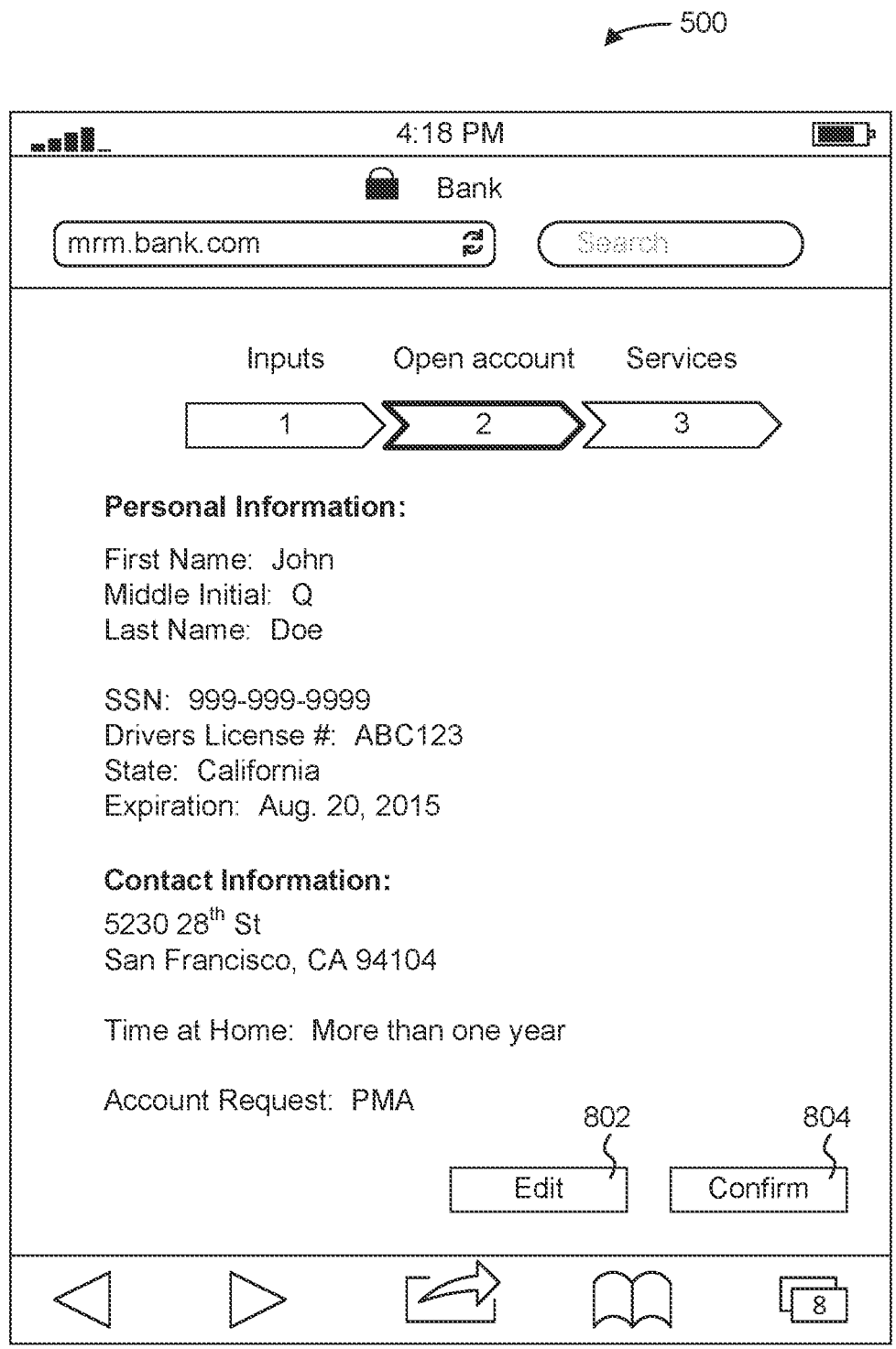
FIG. 8 is an illustration of a user interface of a client device for customer interaction in opening an account, according to an exemplary embodiment.

Referring now to FIG. 8, FIG. 8 shows an example a customer interaction in connection with validating information used for opening the account. In the example of FIG. 8, the banking representative has completed the application and contents of the application are provided to the customer's mobile device. The customer may edit 802, confirm 804, etc. the contents of the application, such as personal identification information, contact information, and so forth. The account activation at step 314 may occur based on the inputs provided by the customer in connection with updating the contents of the application.

Figure 9:
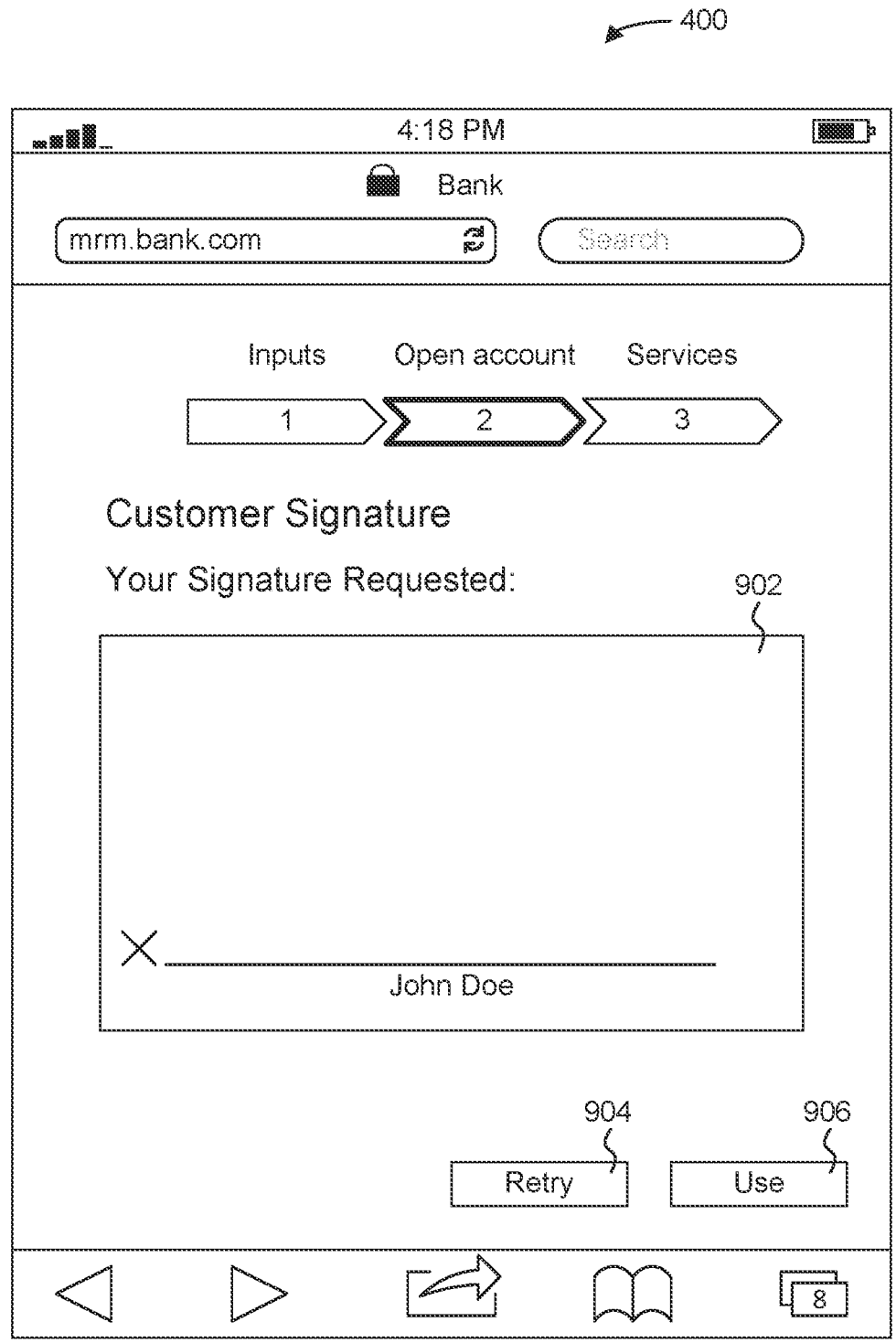
FIG. 9 is an illustration of a user interface of a client device for a customer confirming an opening of an account, according to an exemplary embodiment.

Referring now to FIG. 9, FIG. 9 shows an example of another customer interaction in connection with opening the account. In the example of FIG. 9, the customer may e-sign the document at input field 902. If the customer has difficulty entering the signature, the customer may retry signing by selecting button 904. Alternatively, if the signature is successful, the customer may provide an indication to use the signature by selecting button 906. The account activation at step 314 may occur based on the signature inputs provided by the customer. Additionally, the customer may fund the account by providing cash, a check, etc, either in person or electronically.

Figure 10:
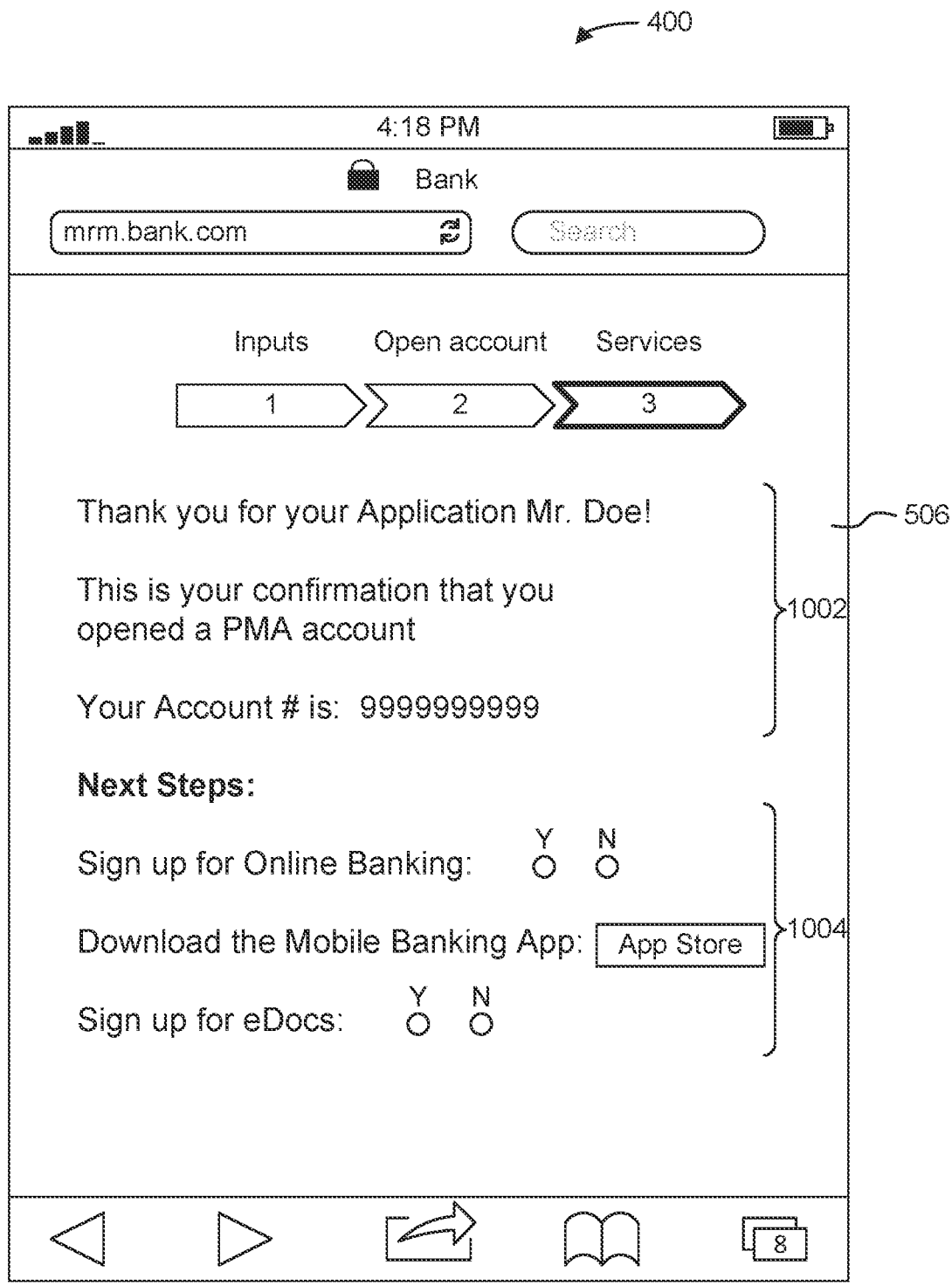
FIG. 10 is an illustration of a user interface of a client device for providing additional steps to a customer after the opening of an account, according to an exemplary embodiment.

Referring now to FIG. 10, FIG. 10 shows an example of a display that may be shown to the customer after an account has been opened. In the example of FIG. 10, a summary of the account is provided to the customer in field 1002. For example, the summary may include the type of account and an account number. Additional steps may be suggested to the customer after the account is open in field 1004. For example, the additional steps may include signing up for online banking, downloading a mobile bank app, and signing up for paperless documents, and so on.

Figure 11:
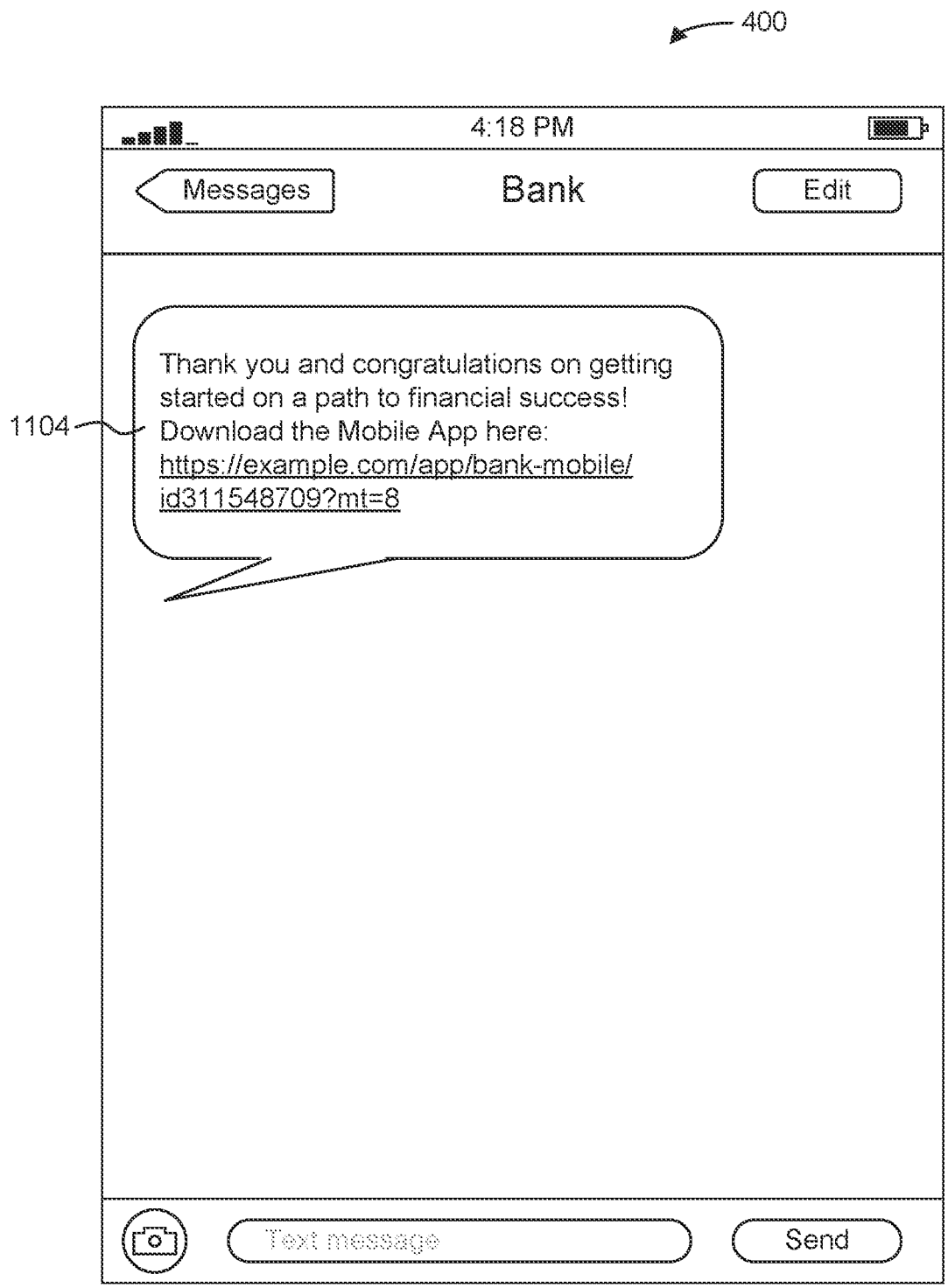
FIG. 11 is an illustration of a user interface of a client device for providing a message after the account opening process, according to an exemplary embodiment.

Referring now to FIG. 11, FIG. 11 shows an example of a display that may be shown to the customer upon completion of the account opening process. In the Example of FIG. 11, the customer receives an SMS text message from the banking representative with additional information. For example, in FIG. 11, the customer receives text message 1104 with a link to down load a mobile application for online banking via the customer's mobile device.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of activating a bank account via communication between a bank computer system and a client device associated with a customer, the method comprising:

receiving, by the bank computer system from a bank store computer, contact information for contacting the customer via a communication medium;

transmitting, by the bank computer system to the client device via the communication medium, a message comprising a selectable link, the selectable link including an expiration parameter that deactivates the selectable link after a first set amount of time;

upon receipt of a selection of the selectable link within the first set amount of time, establishing, by the bank computer system, a connection with the client device via a communication network for a simultaneous browsing experience, the connection being established while the client device is located within a bank store location associated with the bank store computer;

transmitting, by the bank computer system to the client device during the simultaneous browsing experience, first information for display via a graphical user interface (GUI);

receiving, by the bank computer system from the bank store computer during the simultaneous browsing experience, customer information relating to activation of the bank account during the display of the first information via the GUI on the client device while the customer is engaged in an in-person interaction with a bank representative;

transmitting, by the bank computer system to the client device during the simultaneous browsing experience, second information for display via the GUI comprising the customer information while the client device is located within the bank store location, the second information displayed subsequent to the first information for display, the second information configured to be displayed with an interactive slider component;

receiving, by the bank computer system from the client device during the simultaneous browsing experience, a customer input via the interactive slider component while the client device is located within the bank store location;

identifying, by the bank computer system, at least one of a product or service based on the customer input;

transmitting, by the bank computer system to the client device during the simultaneous browsing experience, third information regarding the at least one of the product or service for display on the client device, the third information including a second selectable link associated the identified at least one of the product or service, the second selectable link including a second expiration parameter that deactivates the second selectable link within a second set amount of time;

receiving, by the bank computer system from the client device during the simultaneous browsing experience, a second selection of the second selectable link associated with the identified at least one of the product or service within the second set amount of time; and opening, by the bank computer system, a first account based on the customer information and the customer input received from the client device during the simultaneous browsing experience, and opening a second account according to the identified at least one of the product or service and based on the selection of the second selectable link, the customer information, and the customer input received from the client device.

2. The method of claim 1, wherein the contact information for contacting the customer via the communication medium comprises a mobile telephone number, and wherein the message comprising the selectable link is transmitted to the client device using the mobile telephone number.

3. The method of claim 1, wherein the second information further includes a bar graph, wherein the interactive slider component is positioned proximate to the bar graph.

4. The method of claim 1, wherein the customer input includes an indication of a financial preference of the customer relating to the activation of the first account.

5. The method of claim 1, wherein the customer input is received when the customer interacts with the GUI, and wherein the GUI includes an indication of the customer's progress relative to a financial goal of the customer, the method further comprising:
receiving, by the bank computer system via the customer input, a modification to the financial goal or to the indication of the customer's progress relative to the financial goal.

6. The method of claim 1, wherein
the third information comprises a pop-up window including the selectable link associated with the at least one of the product or service.

7. The method of claim 1, wherein the customer input is received when the customer interacts with the GUI, and wherein the GUI further depicts personal identification information of the customer, and wherein the method further comprises:
receiving, by the bank computer system via the customer input, a modification to the personal identification information.

8. The method of claim 1, wherein the customer information comprises information obtained in connection with a customer needs assessment document.

9. A method of electronic communication, the method comprising:
receiving, by a bank computer system, contact information for contacting a customer via a communication medium, wherein the bank computer system comprises a bank store computer located within a bank store location and communicably coupled with a bank communication network;
transmitting, by the bank computer system to a client device associated with the customer via the communication medium, a message comprising a selectable link, the selectable link including an expiration parameter that deactivates the selectable link after a set amount of time;
establishing, by the bank computer system based upon receipt of a selection of the selectable link within the set amount of time, a connection with the client device via a communication network for a simultaneous browsing experience, wherein the connection is established while the client device is in the bank store location;
providing, by the bank computer system during the simultaneous browsing experience, first information for display on the client device via an interactive graphical user interface (GUI) while the client device is in the bank store location;
receiving, by the bank computer system from the bank store computer during the simultaneous browsing experience, customer information relating to activation of a bank account during the display of the first information on the client device via the interactive GUI while the client device is in the bank store location;
providing, by the bank computer system to the client device during the simultaneous browsing experience, second information for display on the client device via the interactive GUI while the client device is in the bank store location, the second information comprising the customer information and an interactive slider component, wherein the second information is displayed subsequent to the first information;
receiving, by the bank computer system from the client device via the interactive GUI during the simultaneous browsing experience, a first customer input and a second customer input from the client device during the display of the second information and while the client device is in the bank store location, the first customer input via the interactive slider component, the second customer input comprising at least one of (i) an update to personal identification and contact information of the customer and (ii) an update to financial information of the customer;
identifying, by the bank computer system, at least one of a product or service based on the first customer input;
transmitting, by the bank computer system to the client device during the simultaneous browsing experience, third information regarding the at least one of the product or service for display on the client device, the third information including a second selectable link associated the identified at least one of the product or service, the second selectable link including a second expiration parameter that deactivates the second selectable link within a second set amount of time;
receiving, by the bank computer system from the client device during the simultaneous browsing experience, a second selection of the second selectable link associated with the identified at least one of the product or service within the second set amount of time; and
opening, by the bank computer system, a first account based on the customer information and the second customer input received from the client device during the simultaneous browsing experience, and opening a second account according to the identified at least one of the product or service and based on the selection of the second selectable link, the customer information, and the first customer input received from the client device.

10. The method of claim 9, wherein the contact information for contacting the customer via the communication medium comprises a mobile telephone number, and wherein the message comprising the selectable link is transmitted to the client device using the mobile telephone number.

11. The method of claim 9, wherein the second information further includes a bar graph, wherein the interactive slider component is positioned proximate to the bar graph.

12. The method of claim 9, wherein the interactive GUI includes an indication of the customer's progress relative to a financial goal of the customer, the method further comprising:
receiving, by the bank computer system, a modification from the customer to the financial goal or to the indication of the customer's progress relative to the financial goal.

13. The method of claim 9, wherein
the third information includes a pop-up window having the second selectable link associated with the at least one of the product or service.

14. The method of claim 9, wherein the interactive GUI further displays personal identification information of the customer, and wherein the method further comprises:
receiving, by the bank computer system from the client device via the interactive GUI, a modification to the personal identification information.

15. A bank computing system for facilitating opening a customer bank account with a bank, the bank computing system comprising:

a processing circuit comprising at least one processor coupled to at least one memory storing instructions therein that, when executed by the at least one processor, cause the processing circuit to:
  receive, from a bank store computer, contact information for contacting a customer via a communication medium;
  transmit, to a client device associated with the customer via the communication medium, a message comprising a selectable link, the selectable link including an expiration parameter to deactivate the selectable link after a predetermined amount of time;
  establish, based upon receipt of a selection of the selectable link within the predetermined amount of time, a connection with the client device via a communication network for a simultaneous browsing experience, wherein the connection is established while the client device is in a bank store location associated with the bank store computer;
  provide, during the simultaneous browsing experience, an interactive display to the customer via the client device while the client device is in the bank store location, the interactive display showing first information;
  receive, from the bank store computer during the simultaneous browsing experience, customer information relating to activation of the customer bank account during the display of the first information via the interactive display on the client device while the client device is in the bank store location;
  provide, via the interactive display to the client device during the simultaneous browsing experience, second information for display comprising the customer information, the second information displayed subsequent to the first information and configured to be displayed with an interactive slider component;
  receive a first customer input and a second customer input from the client device, the first customer input via the interactive slider component, the second customer input comprising at least one of (i) an update to personal identification and contact information of the customer and (ii) an update to financial information of the customer;
  identify at least one of a product or service based on the first customer input;
  transmit, to the client device during the simultaneous browsing experience, third information regarding the at least one of the product or service for display on the client device, the third information including a second selectable link associated the identified at least one of the product or service, the second selectable link including a second expiration parameter to deactivate the second selectable link within a second predetermined amount of time;
  receive, from the client device during the simultaneous browsing experience, a second selection of the second selectable link associated with the identified at least one of the product or service within the second predetermined amount of time;
  open, during the simultaneous browsing experience, the customer bank account based on the customer information and the second customer input received from the client device; and
  open, during the simultaneous browsing experience, a second account according to the identified at least one of the product or service and based on the selection of the second selectable link, the customer information, and the first customer input received from the client device.

16. The bank computing system of claim 15, wherein the contact information for contacting the customer via the communication medium comprises a mobile telephone number, and wherein the message comprising the selectable link is transmitted to the client device using the mobile telephone number.

17. The bank computing system of claim 15, wherein the second information further includes a bar graph, wherein the interactive slider component is positioned proximate to the bar graph.

18. The bank computing system of claim 15, wherein the interactive display includes an indication of the customer's progress relative to a financial goal of the customer, the processing circuit further configured to:
  receive a modification from the customer to the financial goal or to the indication of the customer's progress relative to the financial goal.

19. The bank computing system of claim 15, wherein
  the third information includes a pop-up window having the second selectable link associated with the at least one of the product or service.

20. The bank computing system of claim 15, wherein the interactive display further includes personal identification information of the customer, the processing circuit further configured to:
  receive a modification to the personal identification information from the client device.

* * * * *